US007963058B2

(12) United States Patent
Kinzel et al.

(10) Patent No.: US 7,963,058 B2
(45) Date of Patent: Jun. 21, 2011

(54) DECORATION, SIGN AND LIGHTING DISPLAY SYSTEM

(75) Inventors: Alan Manning Kinzel, Mesa, AZ (US); Donald John Kinzel, Sun City, AZ (US)

(73) Assignee: Holiday Today, LLC, Mesa, AZ (US)

( * ) Notice: Subject to any disclaimer, the term of this patent is extended or adjusted under 35 U.S.C. 154(b) by 250 days.

(21) Appl. No.: 12/290,552

(22) Filed: Oct. 31, 2008

(65) Prior Publication Data

US 2009/0113774 A1 May 7, 2009

Related U.S. Application Data

(60) Provisional application No. 61/001,893, filed on Nov. 5, 2007.

(51) Int. Cl.

| | |
|---|---|
| ***G09F 13/00*** | (2006.01) |
| ***G09F 19/00*** | (2006.01) |
| ***B60Q 1/00*** | (2006.01) |
| ***B60Q 3/00*** | (2006.01) |
| ***B60Q 11/00*** | (2006.01) |
| ***F21V 21/00*** | (2006.01) |
| ***F21V 21/26*** | (2006.01) |
| ***F21S 8/00*** | (2006.01) |
| ***B60Q 1/06*** | (2006.01) |

(52) U.S. Cl. ............ 40/431; 40/430; 362/469; 362/484; 362/479; 362/249.16; 362/271; 362/272; 362/286; 362/386; 362/418; 362/428; 362/806

(58) Field of Classification Search .................... 40/431, 40/430; 362/468, 484, 479, 249.16, 271, 362/272, 286, 386, 418, 428, 806
See application file for complete search history.

(56) References Cited

U.S. PATENT DOCUMENTS

| | | | | |
|---|---|---|---|---|
| 4,667,276 | A * | 5/1987 | Cheng | 362/249.01 |
| 6,494,565 | B1 * | 12/2002 | Ellson et al. | 347/46 |
| 6,494,591 | B1 * | 12/2002 | Guimond | 362/237 |
| 6,494,595 | B1 * | 12/2002 | Lin | 362/249.1 |
| 6,655,817 | B2 * | 12/2003 | Devlin et al. | 362/233 |
| 7,878,684 | B2 * | 2/2011 | Nauman | 362/249.1 |
| 2004/0085765 | A1 * | 5/2004 | Hermanson et al. | 362/249 |

* cited by examiner

*Primary Examiner* — Joanne Silbermann
*Assistant Examiner* — Syed A Islam

(57) ABSTRACT

The invention relates to a device and method of its use to temporarily or permanently display decorations, signs or lighting. The device is especially suited for displaying from a structure, such as under the eave of a house. The inventive device is capable of conveniently rotating an attached display or lighting arrangement in and out of view, at will. It is particularly useful for the permanent display of holiday decorations, including string-lights and to display them during the holidays but remove them from sight during the remainder of the year.

16 Claims, 6 Drawing Sheets

A.

B.

A.

B.

DECORATION, SIGN AND LIGHTING DISPLAY SYSTEM

CROSS-REFERENCES TO RELATED APPLICATIONS

This application claims priority to U.S. Provisional application 61/001,893 filed Nov. 5, 2007 the contents herein are incorporated by reference.

1. FIELD OF INVENTION

The inventive subject matter relates to a system designed to temporarily or permanently display and store signs, decorations and lighting, including those typically used during the holiday season.

2. DESCRIPTION OF RELATED ART

Installing and removing the decorations is very laborious and time consuming. Additionally, displaying or re-displaying decorations can be hazardous. This is especially true during holiday periods, such as Christmas, when often the weather is inclement. The frequent installation and taking down of displays or decorations on large structures can also result in damage to the structure to which the display is attached.

Permanent installation of lights or decorations, such as Christmas ornaments, onto houses or other structures results in the ornaments being visible, even during periods when display is not needed or desired. Therefore, a need exists for a device capable of permanently affixing displays, holiday decorations or lights to a structure that also permits the convenient removal from view of a display after the need for viewing passes.

SUMMARY OF THE INVENTION

The invention relates to a device, and method of its use, to temporarily or permanently displaying signs or lights. The inventive display device is contemplated in being useful for the display of advertising signs or other types of displays or lighting. The invention also relates to the display of holiday decorations and lights. The contemplated inventive device and method would be capable of maintaining the display permanently on a structure but be capable of conveniently bringing into view or retracting from view the display or lights at will.

BRIEF DESCRIPTION OF THE DRAWINGS

FIG. 1A is a diagram of display device illustrating position of rotating assembly and positioning staff with lighting brackets attached. FIG. 1B is a diagram of a bracket. FIG. 1B shows a cross-sectional view of the positioning staff and lighting or display assembly.

FIG. 5A illustrates an example of the basic components of the string-light bracket. FIG. 5B is the bracket shown in FIG. 5A rotated 90° toward the reader.

DETAILED DESCRIPTION OF PREFERRED EMBODIMENTS

The present invention relates to a device and method to temporarily or permanently display signs, decorations or lighting. The inventive device is capable of retracting from view, either my motor or by a hand-crank assembly, an attached display or lighting arrangement, as desired. The feature whereby a display can be conveniently shown or not shown at will, without removing the display from the structure, permits displays or lighting to be permanently displayed. Any number of types of displays can be attached to the device. These include displays for advertising or informational purposes as well as holiday decorations or lighting arrays.

The device can be located anywhere. However, the ideal placement is to locate the device in an area where the display can be seen but not the device and where the display can be rotated away from view from the public, as desired. An example of a mounting location is under the eave of a house. As a further example, the device is capable of permanently displaying decorations or lighting, such as holiday decorations. The decorations, therefore, can remain all year and only be shown during the relevant holiday season.

A number of alternatives configurations of the display device are possible. However, in all alternative configurations, an important characteristic is that an attached display can be conveniently rotated away from view. Rotation of an attached display is either directly, by hand, or via a motor or hand-crank. However, as assistance in fully disclosing the invention and features, examples are provided.

Example 1

Components of Device

Figure 1:
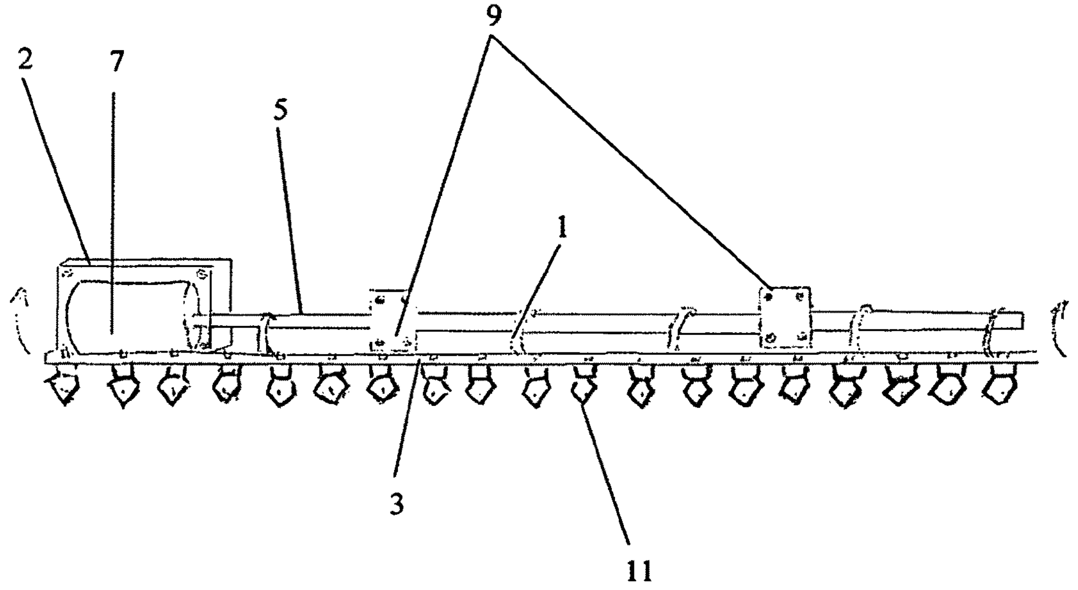
FIG. 1. Diagram of display device.
Figure 1:
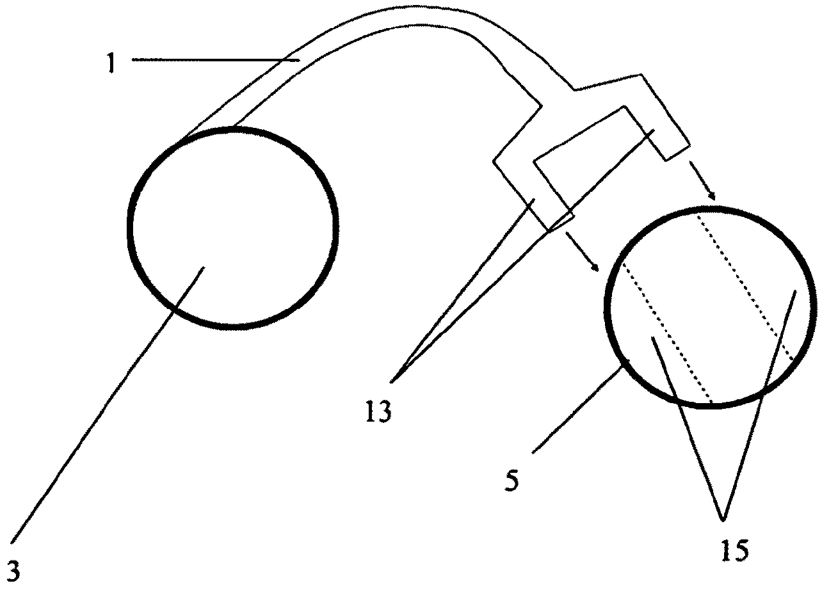

A preferred embodiment of the display device is illustrated in FIG. 1. As shown in FIG. 1, the device comprises multiple brackets (1) for attaching a display or lighting assembly (3) to a positioning staff (5). As an example, shown in FIG. 1A is the device with a lighting assembly attached to the positioning staff (5). However, a display would be similarly located and operably connected to the positioning staff (5). The positioning staff (5) is made of any type of material that is strong enough to support the weight of the desired display. Since the inventive device is designed for year-round service, a preferred embodiment is to construct the positioning staff (5) out of a non-corrosive material, such as aluminum or plastic.

A number of bracket designs are contemplated as long as the design permits removing and interchanging displays and lighting to the positioning staff. FIG. 1B is a cross-sectional view of the positioning staff (5) and lighting or display assembly (3) that illustrates an example of a contemplated bracket design. The brackets are also shown in smaller scale in FIG. 1A. In this embodiment, the brackets are firmly attached to the display or lighting assembly (3) at one end of the bracket. On the opposite end, the bracket contains two finger-like projections (13). The finger-like projections (13) snap into pre-machined grooves (15) contained in the positioning staff (5). Insertion of the finger-like projections (13) creates a firm attachment of the bracket (1) to the positioning staff (5), with concomitant firm attachment of the display or lighting assembly (3) to the positioning staff (5).

Figure 2:
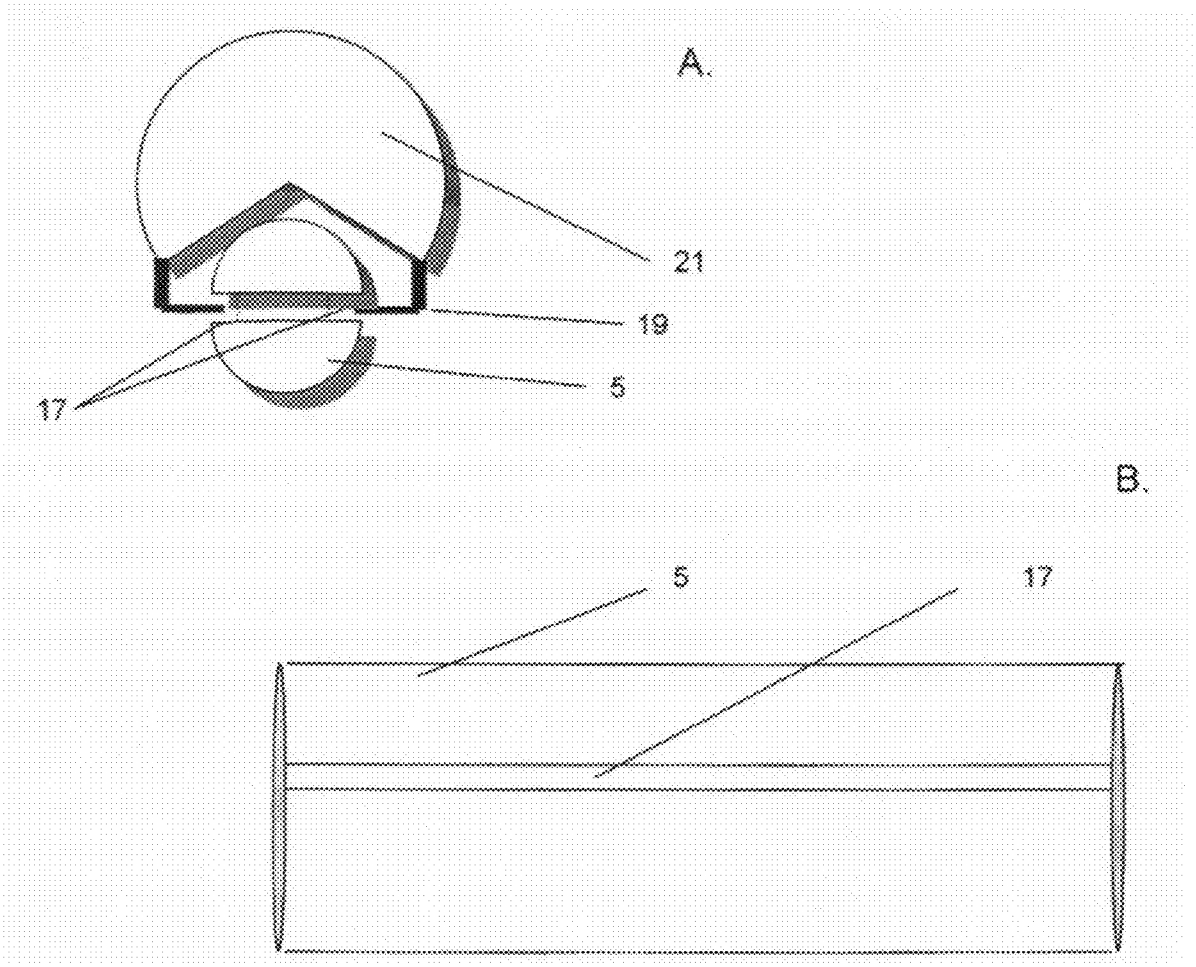
FIG. 2. Diagram of example of an alternate bracket configuration that permits easy repositioning of brackets along the length of the positioning staff.

FIG. 2 illustrates another example of a contemplated bracket design. In this embodiment, finger-like projections (19) fit into grooves (17) running longitudinally along the length of both sides of the positioning staff (5). This arrangement permits the bracket (21), connected to a display (3), as illustrated in FIG. 1, to be adjusted along the length of the positioning staff (5). In FIG. 2, the bracket (21) is shown as a half circle merely to show operable association with the positioning staff. However, it is recognized that the bracket (21) can be any shape necessary to operably connect the positioning staff to a lighting display or other type of display, as illustrated in FIG. 1.

Also illustrated in FIG. 1, the positioning staff (5) is connected to a rotating device (7), housed in a rotating assembly (2). The rotating device (7) enables the positioning staff to rotate up to 360° degrees or more, thereby moving the display either in or out of view. The rotating device (7) can be an attached hand-crank and gear assembly, or, alternatively, an electric motor. FIG. 1 illustrates the device with an electric motor. In a preferred embodiment, the motor is operated via a remote control device. A preferred feature of the remote control is a timer that automatically rotates attached displays in or out of view at preset times or days. Additionally, in a preferred embodiment, the remote control would be able to be programmed to cause the motor to rotate the positioning staff (5) a set pre-programmed number of revolutions.

Figure 3:
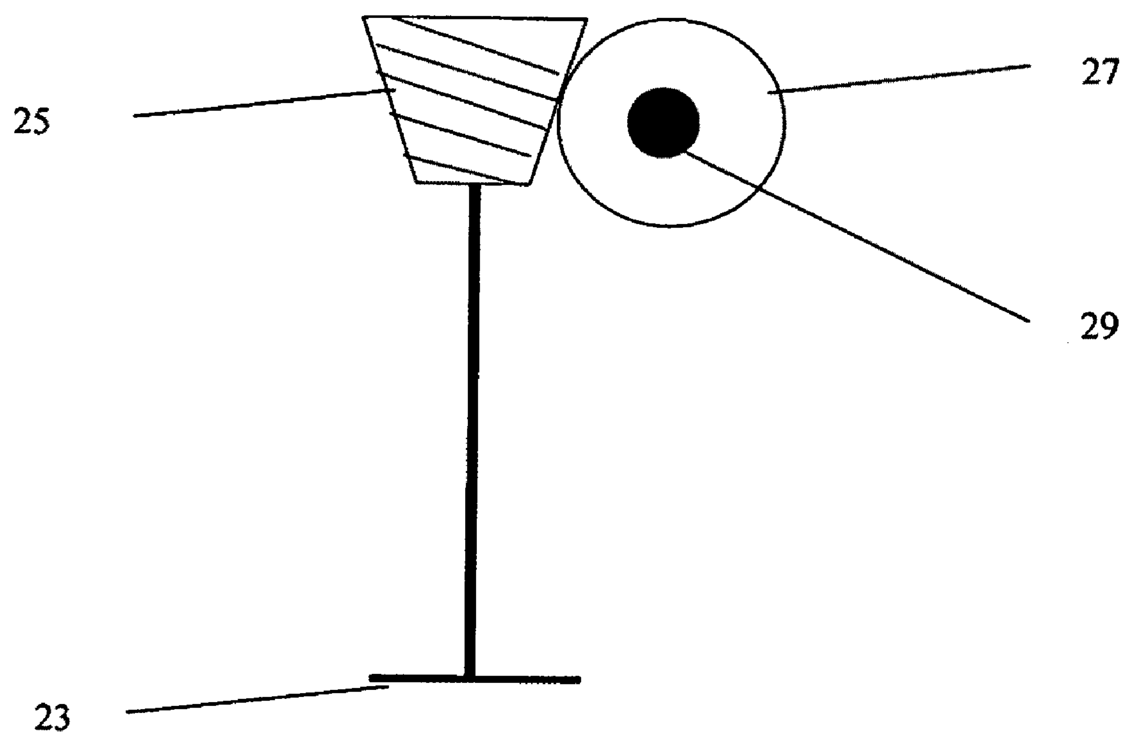
FIG. 3. Diagram of hand-crank assembly.

An example of a hand-crank assembly is illustrated in FIG. 3. Referring to FIG. 3, turning the hand-crank (23), which can be a circular wheel or lever, turns a first gear (25) that is operably connected to and turns a second gear (27). Referring to FIG. 3 and FIG. 1, the second gear (27) contains a spindle (29) that is operably connected to the positioning staff (5). Therefore, rotation of the second gear (27) results in rotation of the positioning staff (5). The hand-crank and gear assembly illustrated in FIG. 3 is only an example. It is recognized that other crank and gear-arrangements are possible that result in rotation of an attached display or lighting assembly.

Figure 4:
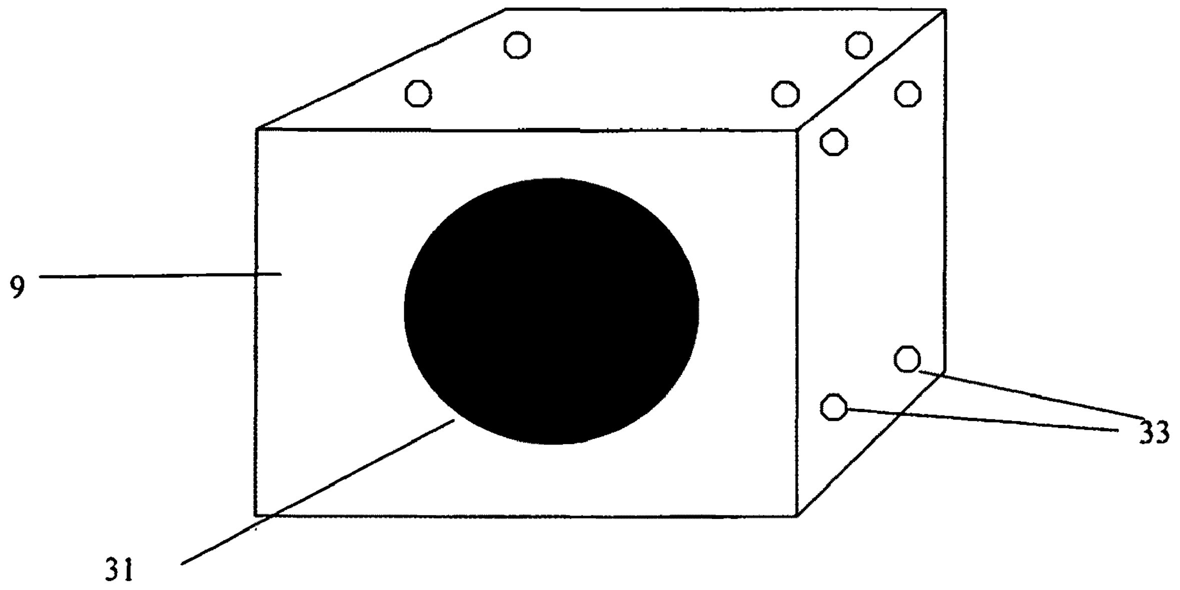
FIG. 4. Diagram of stabilization unit showing space for passing positioning staff and points for adhering stabilization unit to a structure.

Again referring to FIG. 1, the positioning staff (5), opposite the rotating device (7), is attached to one or more stabilization units (9). As illustrated in FIG. 4, each stabilization unit (9) contains an orifice (31), through which the positioning staff (5) can pass. Passage of the positioning staff (5) through the orifice (31) results in a fit that provides stability to the positioning staff (5) but permits its free rotation. The stabilization unit (9) also contains a means for attaching to a structure, such as by bolts or screws (33). The arrangement of attaching means permits the display device to be attached either to the side of a structure or on the surface of an over-hang. Attachment means are located not only on the stabilization unit (9) but also on the rotating assembly.

Example 2

Figure 5:
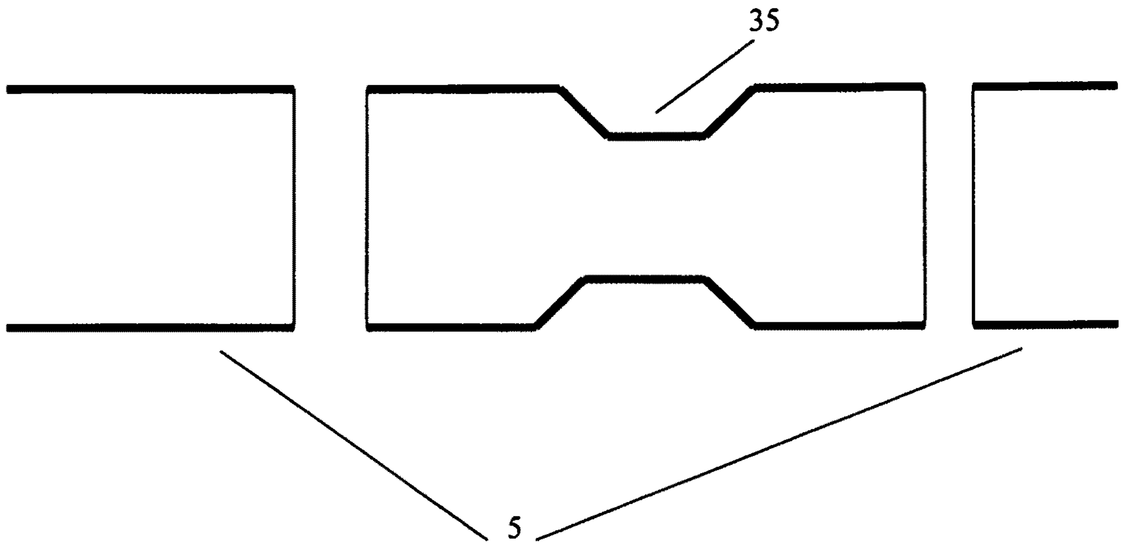
FIG. 5. Diagram of extension component.

Inventive Display Device is Capable of incorporating Multiple Size Displays or Lighting Assemblies The positioning staff (5) can be of variable lengths in order to more optimally accommodate installation location and intended displays. Illustrated in FIG. 5 is an extension (35), used to join sections of positioning staff lengths (5). Two or more positioning staff lengths can be joined to construct a display of any length desired. For longer length displays, additional stabilization units (9), shown in FIG. 1, can be added for additional support of the display.

There may, however, be circumstances where multiple display lengths are needed. In order to avoid removing and re-attaching stabilization units to fit different length positioning staff lengths, the stabilization unit can be attached to a bracket capable of permitting the stabilization unit to move laterally closer or away from the rotating device (7). This bracket can be any type of or configuration, such as a bracket that contains a movable slide. Alternatively, the bracket can contain multiple bolt attachment points so that, once the bracket is affixed to a structure, a stabilization unit (9) can be attached or re-attached at several points along the bracket. Also, additional stabilization units (9) can be added to the bracket in order to provide greater stability to the display, especially if the display is relatively heavy.

Example 3

Display Device is Utilizing Different Display or Light Assemblies

The contemplated invention is capable of accommodating different display or lighting assembly designs, dependent on the type of display or light arrangement desired. For example, a display or decoration requiring no lighting would use a display assembly comprising only a bar or tube structure, with brackets (1), as illustrated in FIG. 1, for connecting the display assembly (3) to the positioning staff (5). Alternatively, a lighting assembly (3) can be connected to the positioning staff (5), as shown in FIG. 1. As for other displays, the bracket and light assembly arrangement permits the lights to rotate 360° or more in order to move the lighting assembly and lights in or out of view. It is contemplated that different types of brackets will be available in order to accommodate different types of lights and lighting assembly designs.

FIG. 1 illustrates the basic lighting assembly. As shown in FIG. 1, the lighting assembly contains a light strip (3) that functions to hold the bulbs (11) in place and to supply electrical power to the bulbs (11). The light strip (3) of the lighting assembly (3) can be made of any type of material. However, in a preferred embodiment the outside of the strip is a non-electrically conducting material to prevent electric shock.

Any means for securing the bulbs (11) to the strip (3) is possible. However, in a preferred embodiment, the bulb sockets can contain a means, whereby the bulbs can be snapped into the light strip. Alternatively, the light strips (3) contain bulb sockets where the bulbs can be screwed into the strip.

Different strips are envisioned for larger verses smaller commercially available incandescent or other type of light bulbs. In a preferred embodiment, LED bulbs will be used as a power saving feature.

Example 4

Display of String Lights

The inventive device is also contemplated to be capable of utilizing and displaying string lights, such as “icicle” lights typically used during the Christmas or winter holiday season. To display these lights, a special string-light bracket is envisioned. It is recognized that a number of configurations of the string-light bracket is possible. However, in all alternative designs, the basic features comprise a string-light assembly to wind and un-wind the string lights and therefore enable the string of lights to roll up when not in use. An additional inventive feature is for the brackets to be able to be conveniently attached and un-attached to the display device.

Figure 6:
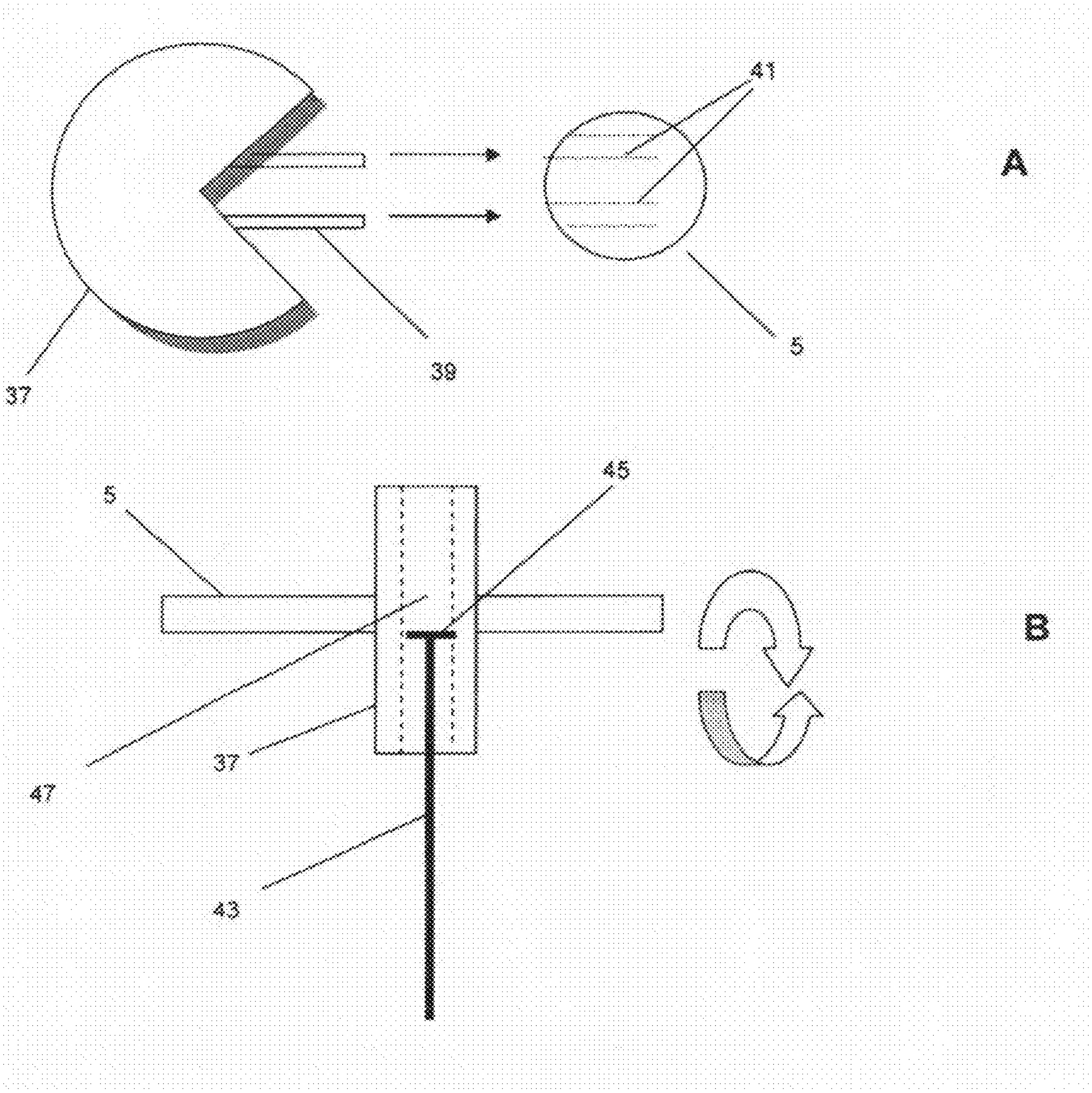
FIG. 6. Diagram of string-light brackets.

As an illustration of the contemplated inventive aspect for string lights, the reader is referred to FIG. 6 in order to assist the reader in understanding the inventive aspects of the bracket. FIG. 6B illustrates the string light holder assembly (37) and positioning staff (5) of FIG. 6A but rotated 900 toward the reader.

The brackets can be used with any size icicle string. The string light brackets are comprised of a string light holder assembly (37), which holds the string of lights, that connects to the positioning staff via finger-like projections (39) that fit into grooves (41) contained in the positioning staff (5). Alternatively, attachment to the positioning staff (5) can be via finger-like projections (19), as shown in FIG. 2, where the finger-like projections (19) fit into a groove (19) that runs longitudinally down the length of the positioning staff (5).

The string light holder assembly (37) can be any shape that permits winding and un-winding of the string lights, such as a circular, wheel-like structure or a diamond shaped structure. All alternative embodiments, however, contain an indentation or similar structure (47) that holds the string of lights when wound. In a preferred embodiment, a different size string light holder assembly (37) is used for large lights, verses a smaller assembly for shorter strings of lights.

FIG. 6B illustrates the operational relationship between a string of lights (43) and its attachment point (45) to the string light holder assembly (37). The string of lights are wound, upon rotation of the string light holder assembly (37), into an indentation or other similar structure (47) in the string light holder assembly (37) that permits the string of lights to be securely stored.

In a preferred embodiment, rotation of the string lights around the string light holder assembly (37) is via a motor with an attached remote control. As a further embodiment, rotation of the string light holder assembly (37) is preprogrammed in order to permit convenient and accurate rotation of the string lights in or out of sight.

In another preferred embodiment, the brackets are custom matched to the length of the light string. Therefore, shorter light strings would utilize a smaller string light holder assembly (37) and a larger assembly would be used for longer strings. If the large and small string light assemblies (37) are properly matched on a single positioning staff (5), then long and short string lights can be simultaneously wound, and hidden from view, using the same degree of positioning staff (5) rotation. The rotation of the positioning staff (5), as previously mentioned, in an alternative embodiment, can be pre-programmed into the remote control.

Having described the invention, one of skill in the art will appreciate in the appended claims that many modifications and variations of the present invention are possible in light of the above teachings. It is therefore, to be understood that, within the scope of the appended claims, the invention may be practices otherwise than as specifically described.

What is claimed is:

1. A display device comprising: a rotating assembly; one or more operably connected lengths of a positioning staff operably connected and horizontally oriented from said rotating assembly and supported by one or more stabilization units, through which the positioning staff protrudes and is freely able to rotate; a display or lighting assembly, with each assembly comprising one or multiple light arrays or displays, operably connected to said positioning staff by one or more brackets, wherein said brackets contain a means to enable said brackets to snap onto said positioning staff and are easily removable and interchangeable and wherein said display device can be attached to a structure by one or more of said stabilization units and rotating assembly containing attachment means and wherein said positioning staff can rotate more than 360 degrees in order to display or remove display or lights from view at will.

2. The display of claim 1, wherein said rotating assembly contains a hand-crank assembly that is operably connected to said position staff.

3. The display of claim 1, wherein said rotating assembly contains an electric motor that is operably connected to said positioning staff.

4. The display device of claim 3, wherein the motor assembly is electrically connected to said display or light.

5. The display device of claim 3, wherein said motor is remotely controlled by a remote control panel.

6. The display device of claim 5, wherein said remote control panel communicates with said motor assembly via a wire or by a wireless communication.

7. The display device of claim 5, wherein the degree of rotation of said positioning staff can be preprogrammed.

8. The display device of claim 1, wherein said positioning staff lengths are connected by an extension piece, wherein said extension piece has two ends wherein each end of said extension piece firmly attaches to one of two ends of a positioning staff length and the other end of said extension piece, attached to a positioning staff length, firmly attaches to an end of another positioning staff length thereby joining the two lengths.

9. The display device of claim 1, wherein said stabilization unit can be attached to a structure at variable distances along the length of said positioning staff.

10. The display device of claim 1, wherein said display are Christmas decorations.

11. The display device of claim 1, wherein said positioning staff is operably connected to a string-light bracket comprising a string light holder assembly wherein said string light holder assembly is caused to rotate by the rotation of said positioning staff.

12. The display device of claim 1, wherein said bracket is operably connected to said positioning staff by finger-like projections on the bracket that are inserted into grooves in said positioning staff.

13. The display of claim 12, wherein said grooves run along the length of the positioning staff on one or more sides of said positioning staff an wherein said bracket can be adjusted along the length of said groove.

14. A method of permanently displaying decorations using the display device of claim 1 comprising the steps:

a. Attaching the display device of claim 1 to a structure;

b. Attaching a display to said display device by said brackets;

c. Rotating said display bracket and said display so that said display is visible or rotating said display bracket and said display in reverse to remove the display from view when said display is no longer needed.

15. The method of claim 14, wherein said display are Christmas decorations.

16. The method of claim 14, wherein said structure is the eave of a house.

* * * * *